(12) United States Patent
Bortoli et al.

(10) Patent No.: US 12,427,608 B2
(45) Date of Patent: Sep. 30, 2025

(54) CLAMP FOR APPARATUSES FOR WELDING PIPES

(71) Applicant: RITMO S.P.A, Teolo (IT)

(72) Inventors: Renzo Bortoli, Montegrotto Terme (IT); Francesco Zigante, Saccolongo (IT)

(73) Assignee: RITMO S.P.A., Teolo (IT)

( * ) Notice: Subject to any disclaimer, the term of this patent is extended or adjusted under 35 U.S.C. 154(b) by 327 days.

(21) Appl. No.: 18/077,529

(22) Filed: Dec. 8, 2022

(65) Prior Publication Data
US 2023/0182238 A1   Jun. 15, 2023

(51) Int. Cl.
*B23K 37/04* (2006.01)

(52) U.S. Cl.
CPC ................ *B23K 37/0435* (2013.01)

(58) Field of Classification Search
CPC .......... B25B 5/04; B25B 5/147; B25B 5/163; B23K 37/0435
See application file for complete search history.

(56) References Cited

U.S. PATENT DOCUMENTS

| | | | |
|---|---|---|---|
| 6,189,878 B1 | 2/2001 | Meese | |
| 10,399,210 B1 | 9/2019 | Rauckman et al. | |
| 2003/0183333 A1* | 10/2003 | Temple | B29C 66/02241 156/379.8 |
| 2007/0013117 A1* | 1/2007 | Bortoli | B25B 5/147 269/268 |
| 2013/0001373 A1* | 1/2013 | Ogawa | F16L 55/035 248/65 |
| 2019/0321947 A1 | 10/2019 | Tager | |
| 2019/0376625 A1 | 12/2019 | Schickling | |

FOREIGN PATENT DOCUMENTS

EP          0070400 A2 *   1/1983

OTHER PUBLICATIONS

English translation EP0070400 (Year: 1983).*

* cited by examiner

*Primary Examiner* — Jason L Vaughan
*Assistant Examiner* — Amanda Kreiling
(74) *Attorney, Agent, or Firm* — DUANE MORRIS LLP; Gregory M. Lefkowitz

(57) ABSTRACT

A clamp, particularly for apparatuses for welding pipes, including a lower jaw and an upper jaw that are mutually opposite and hinged; each jaw is substantially made of plastic material; advantageously, each jaw includes a portion made of plastic material and at least one insert constituted by an interlocking metallic structure that is co-molded within the portion made of plastic material.

11 Claims, 12 Drawing Sheets

CLAMP FOR APPARATUSES FOR WELDING PIPES

The present invention relates to a clamp for apparatuses for welding pipes.

As is known, pipes made of plastic material, typically polyethylene and polypropylene, are widely used in the production of ducts for conveying fluids.

The members made of plastic material, pipes and connectors, are mutually welded by using apparatuses that ensure the coaxiality of the members to be welded.

Welding machines are provided with clamps adapted to lock the head portions of the cylindrical members being processed.

EP2860430 discloses a clamp for locking pipes and/or cylindrical bodies in general, adapted to lock the head portions of the cylindrical members being welded by a welding machines. Such clamp has a first jaw that is associable with a supporting structure, a second jaw, and an articulation means interposed between the first jaw and the second jaw in order to allow the relative rotation of the two jaws about a tilting axis, between an open configuration and a closed configuration in which the two jaws form a substantially circular locking seat. An elastic means that is functionally connected to the two jaws facilitates their opening and/or closure.

US2013001373A1 discloses a clamp for fixing a tube body such as a long pipe, tube, and the like, or a rod-like member such as a rod, a wire, and the like in a state of holding them. The clamp has a clamp main body including a plurality of concave members forming a cylindrical body by combining together. The concave members are formed by hard synthetic resin adapted that should attenuate vibrations of the long bodies.

The type of clamp, as disclosed in EP2860430, is generally constituted by a pair of mutually opposite jaws provided with substantially semicircular concave portions that form a locking seat for the cylindrical body being processed.

One of the jaws can be fixed to a supporting structure and is articulated to the other jaw at one end while at the other end there is a manual or automatic clamping device.

Conventional clamps, especially if large, have a considerable weight and are difficult to handle.

Therefore, a strongly felt technical need is to reduce the weight of the clamps.

The aim of the present invention is to provide a new clamp that allows to significantly reduce the weight, without reducing mechanical performance.

Within the scope of this aim, an object of the invention is to provide a new lightweight clamp that can be moved and used in all situations, rested on the ground horizontally, in air in a vertical position, as a replacement of current clamps of the type provided by aluminum casting.

A further object of the invention is to provide a clamp that can be arranged in the various regions of the machine, where the oil pressure-actuated cylinders are fixed, where the stems of the oil pressure-actuated cylinders are fixed, in order to support the entire clamp assembly when the machine is in the configuration on a supporting frame, et cetera.

A further object of the invention is to provide a clamp that ensures the mechanical strength of the lower jaw in the position in which the oil pressure-actuated cylinders are fixed, where the pins for positioning the plate supporting the heating plate and the locking bar-plate, are fixed externally.

A further object of the present invention is to provide a clamp which, by virtue of its particular constructive characteristics, is capable of giving the greatest assurances of reliability and safety in use.

This aim, these objects and others which will become better apparent hereinafter are achieved by a clamp, as claimed in the appended claims.

Further characteristics and advantages will become better apparent from the description of preferred but not exclusive embodiments of the invention, illustrated by way of non-limiting example in the accompanying drawings, wherein.

Figure 1:
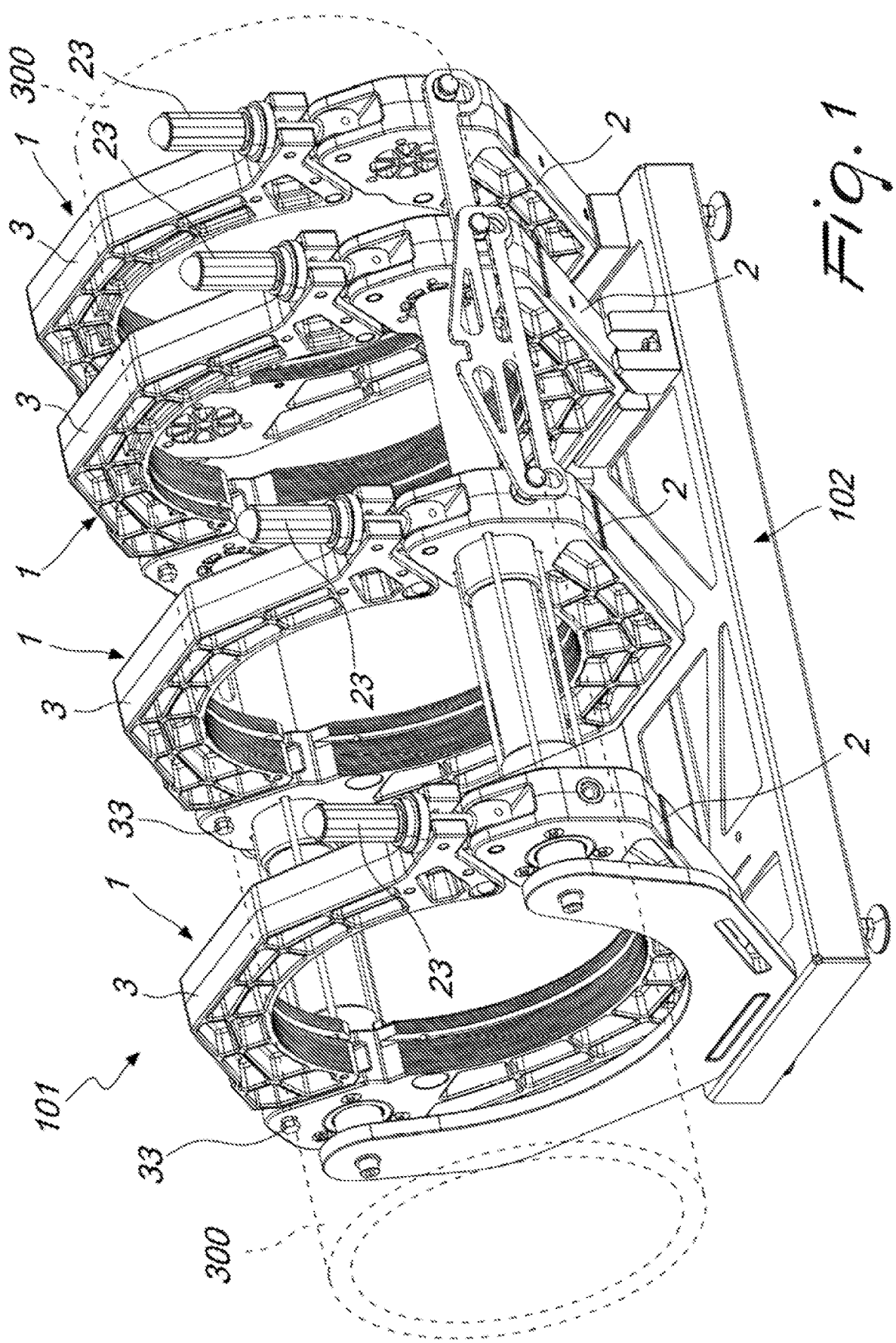
FIG. 1 is a perspective view of an apparatus provided with four clamps, with a supporting frame, according to the present invention.

With reference to the cited figures, the clamp according to the invention, generally designated by the reference numeral 1, includes a lower jaw 2 and an upper jaw 3 that are mutually opposite and hinged to each other.

According to the present invention, each jaw 2 and 3 is made of plastic material and has a metallic insert constituted by an interlocking structure made of metal, for example steel, which is welded and positioned in the mold during the molding of the jaw body, so that it is fully internally co-molded.

The lower jaw 2 has a lower body 21 made of plastics and having a pair of lower inserts 22 made of metal.

The lower insert 22 protrudes for a small portion only, where there is a threaded hole for fastening external components.

The lower insert 22, for the lower jaw 2, is made of steel and is designed to be used both on one side and on the opposite side.

The upper jaw 3 has an upper body 31 made of plastics and having an upper insert 32 made of metal.

The upper jaw 3, made of plastics, is structurally much lighter than the lower jaw and has another type of mechanical stress.

The upper insert 32 has a fork opening 34 accommodating a tension member 23 which is hinged to a hole 24 of a lower insert 22 of the lower jaw 2, in the region where the base of the threaded tension member 23 rests. The threaded tension member 23 is affected by a force that is parallel to the axis of the threaded tension member 23, this is where the tension member moves the upper jaw 3 toward the lower jaw 2, surrounding the pipe 300.

The upper insert 32 is therefore an interlocking structure made of steel which is welded and positioned in the mold during molding, so that it is fully co-molded internally, and therefore is not visible from outside.

The upper jaw 3 is fastened to the lower jaw 2, with a pivot 33, at one side, and allows a rotation for opening and closing.

At the opposite end, the threaded tension member 23 fastened with a pivot to the lower jaw 2 can rotate to enter or exit through a fork opening 34, formed in the upper jaw 3, for clamping and locking the pipe.

FIGS. 1-4 show two embodiments of welding machines wherein the clamp according to the present invention is advantageously used.

Figure 2:
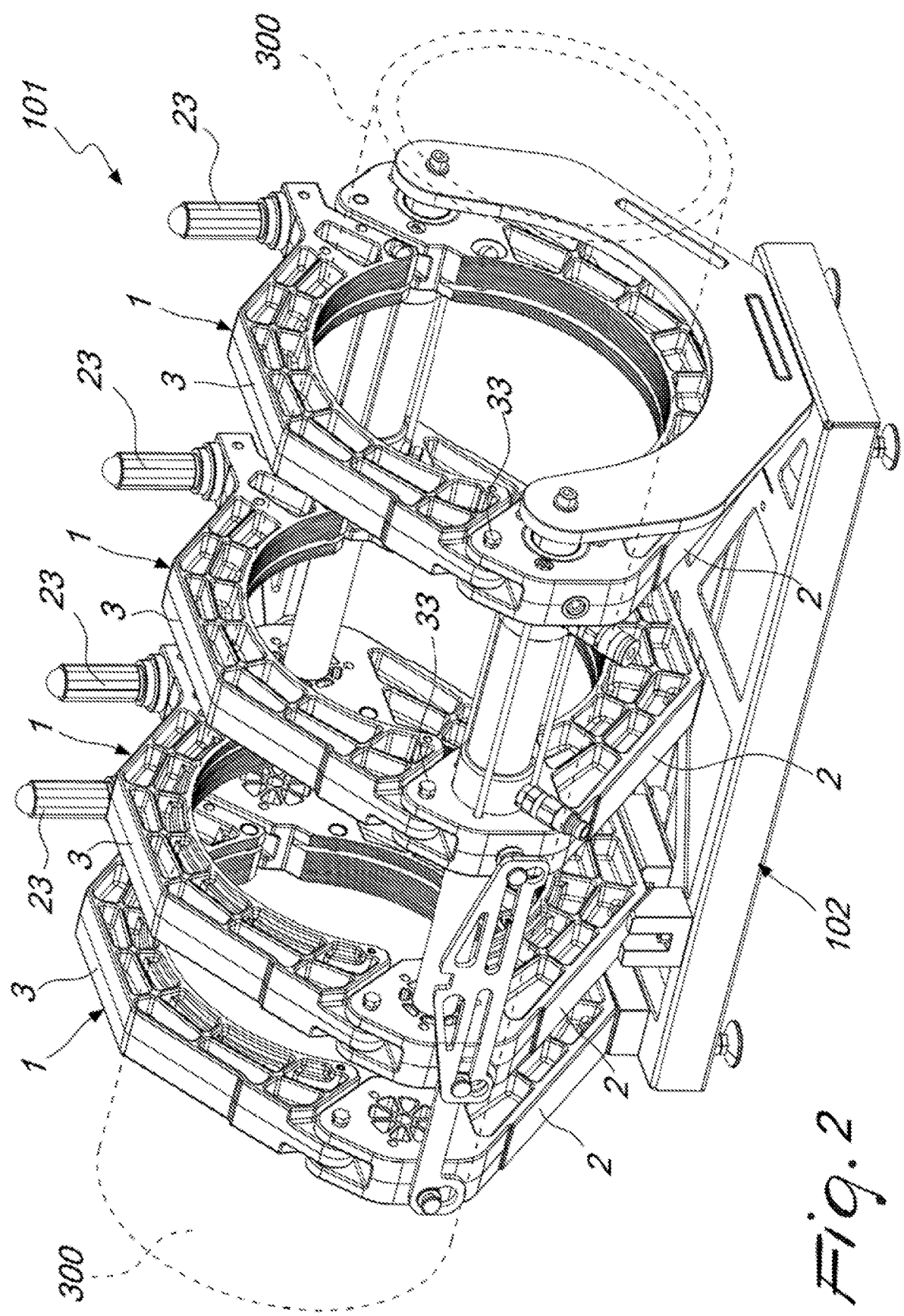
FIG. 2 is a perspective view, from the opposite side with respect to the preceding figure, of the apparatus with four clamps.

FIGS. 1 and 2 show a machine, designated by the reference numeral 101, configured with four clamps 1 and with a supporting frame 102.

Figure 3:
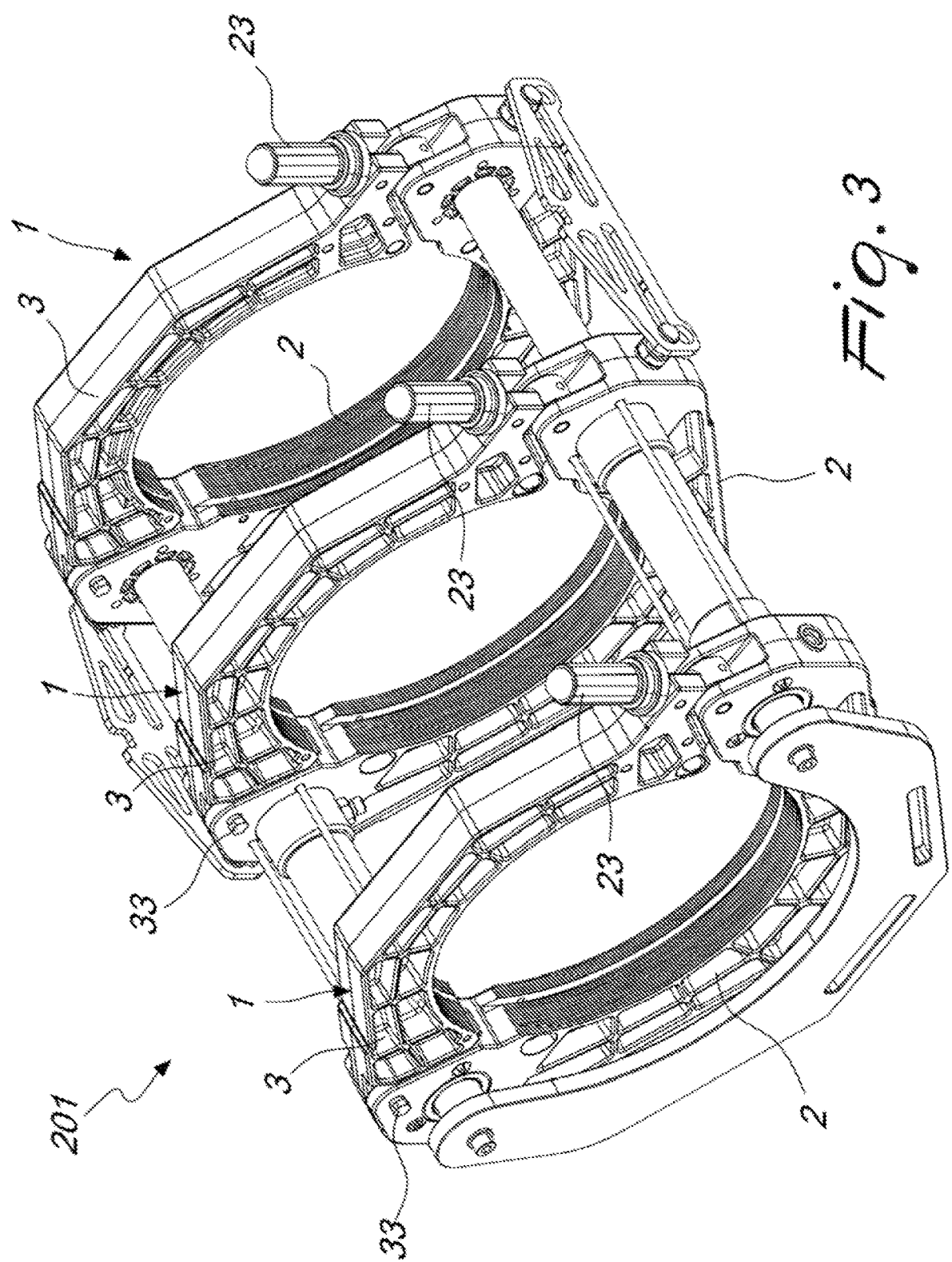
FIG. 3 is a perspective view of an apparatus provided with three clamps, without a supporting frame, according to the present invention.
Figure 4:
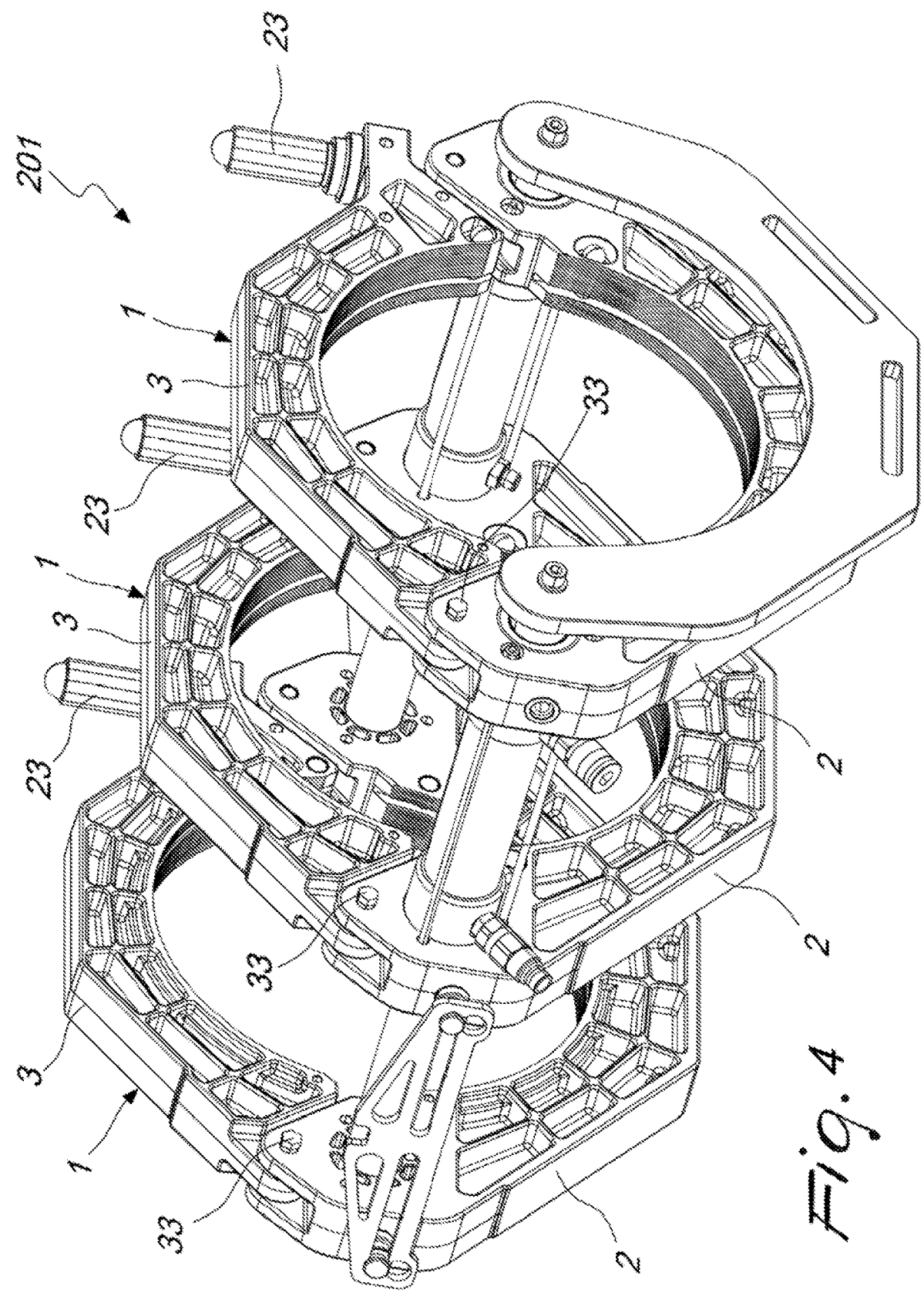
FIG. 4 is a perspective view, from the opposite side with respect to the preceding figure, of the apparatus with three damps.
Figure 5:
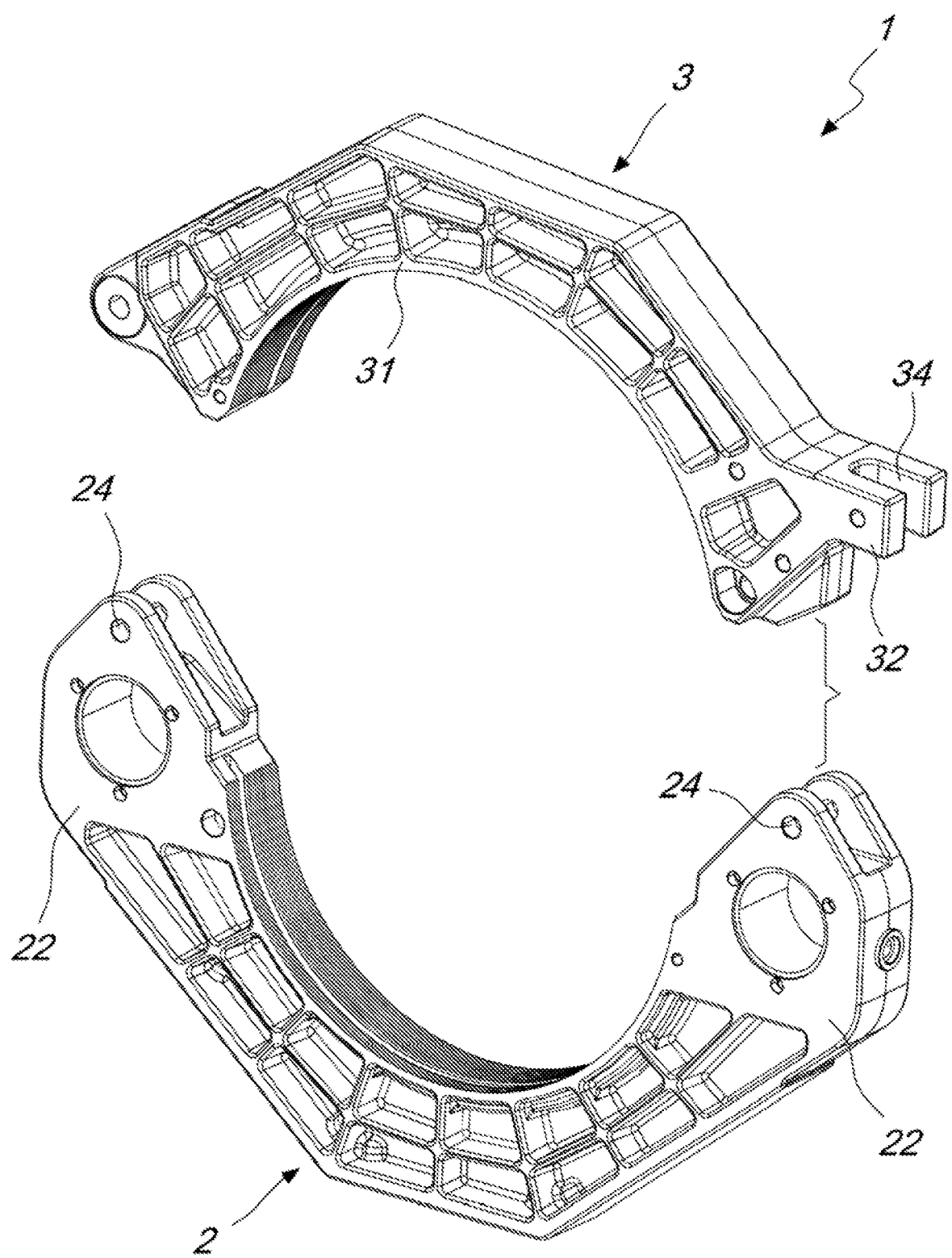
FIG. 5 is a perspective view of a clamp according to the present invention.
Figure 6:
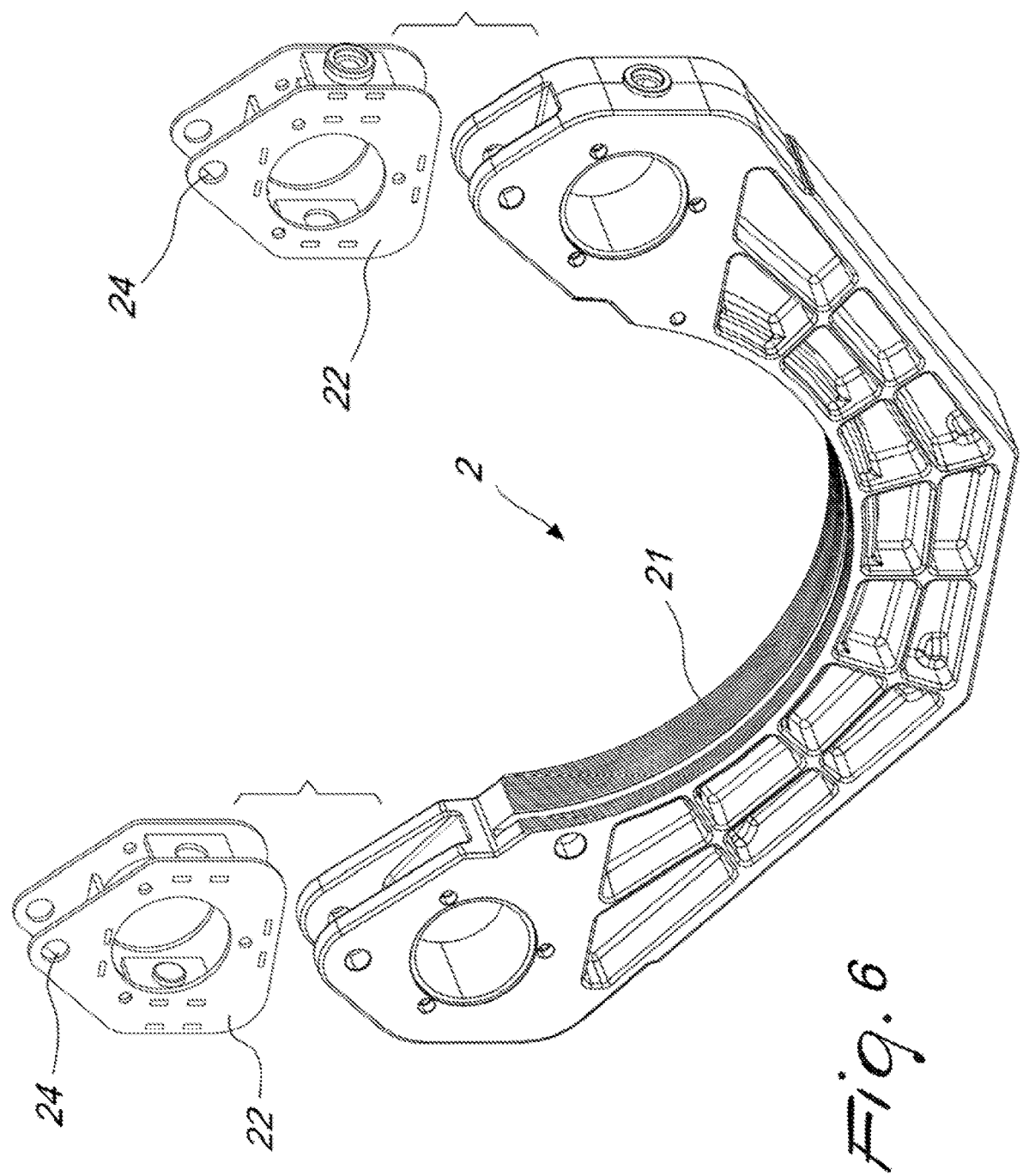
FIG. 6 is an exploded view of the lower jaw of the clamp according to the present invention.
Figure 7:
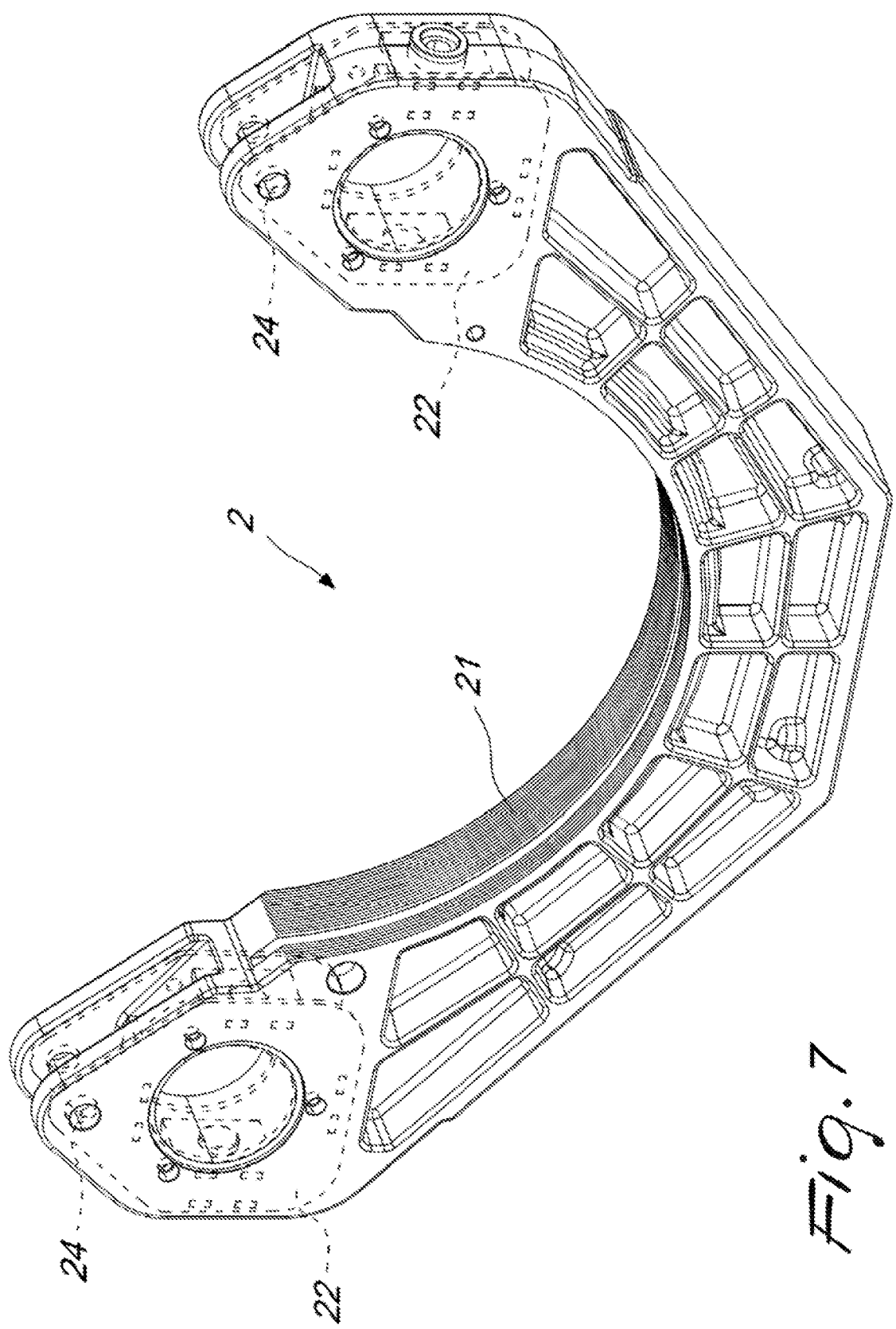
FIG. 7 is a view in phantom lines of the lower jaw.
Figure 8:
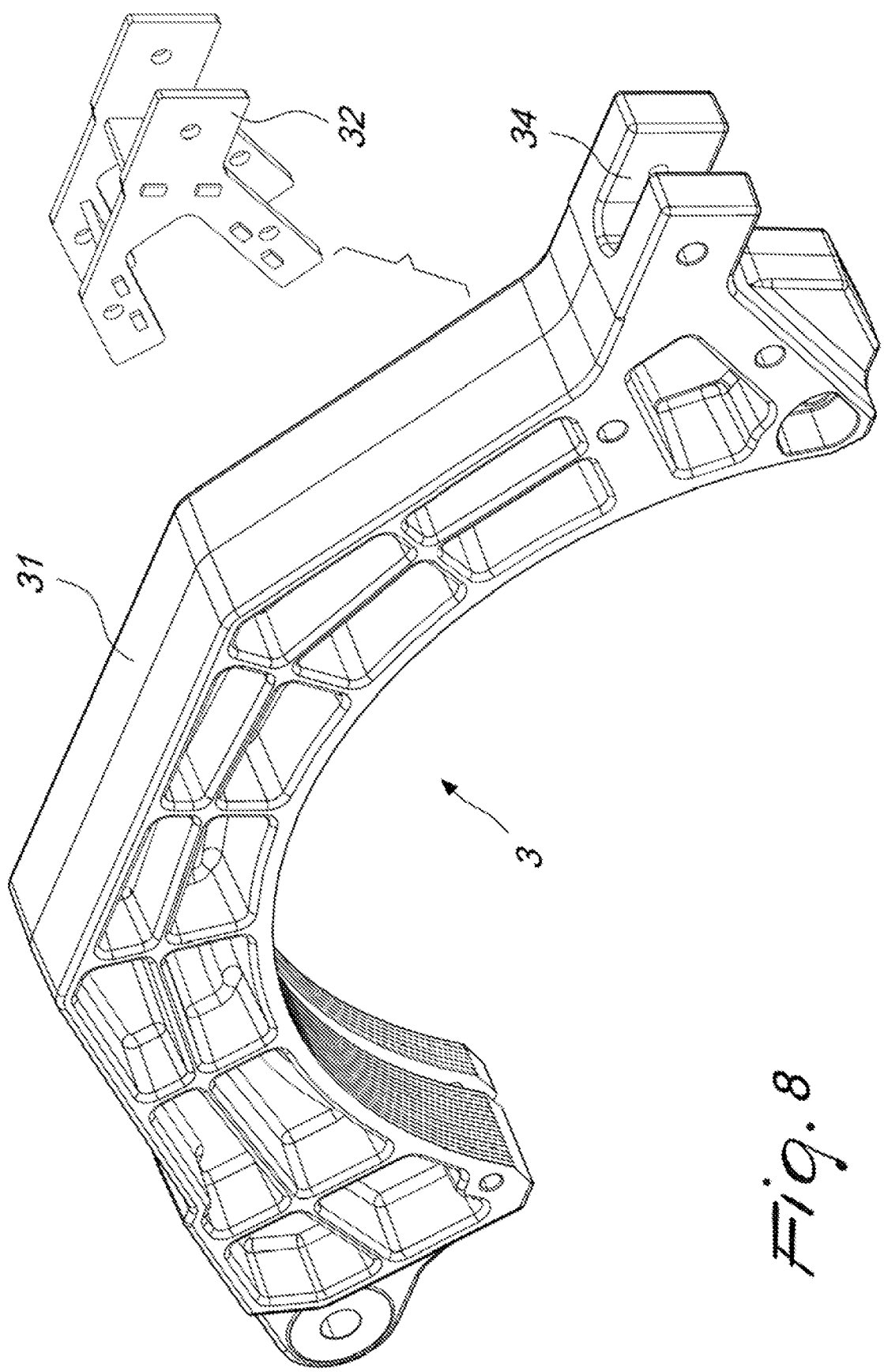
FIG. 8 is an exploded view of the upper jaw of the clamp according to the present invention.
Figure 9:
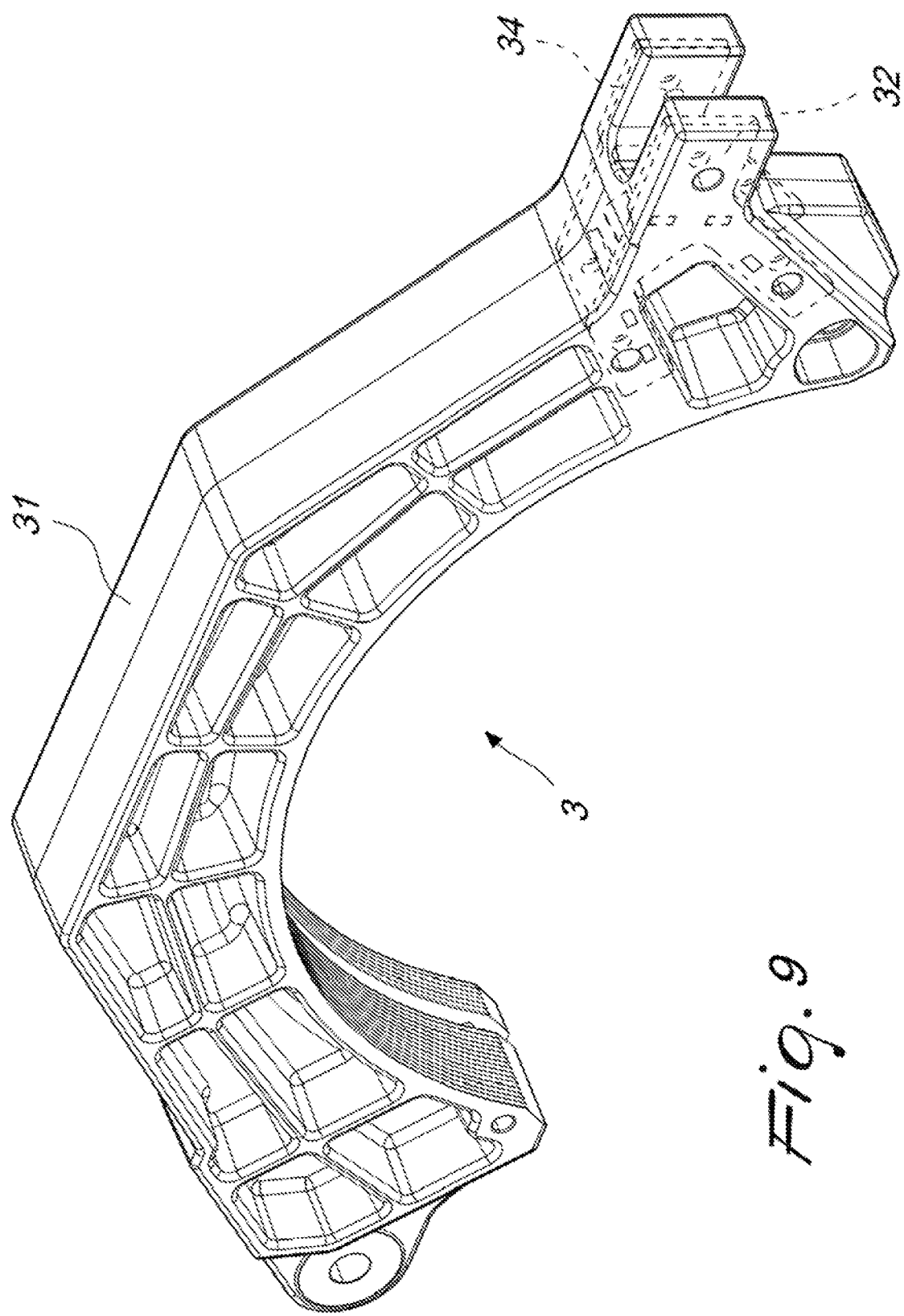
FIG. 9 is a view in phantom lines of the upper jaw.

FIGS. 3 and 4 show a machine, designated by the reference numeral 201, configured with three clamps 1 and to be used without a supporting frame.

The clamp 1 according to the present invention can be advantageously used in various types of apparatuses.

While the lower and upper jaws of the prior art clamps are cast in aluminum, the clamp made of plastics according to the present invention, made by injection molding, allows a fixture that is much lighter, allowing to easily move the clamp and use it in all situations, from resting on the ground horizontally to hanging in a vertical position.

The jaws are designed to be arranged in the various regions of the machine: at the oil pressure-actuated cylinders, at the stems of the oil pressure-actuated cylinders, and a clamp used to keep the entire assembly of the three clamps in position, when the machine is a supporting frame configuration.

With a lower jaw made of plastics, it is necessary to overcome the problem of mechanical strength in the position where the oil pressure-actuated cylinders are fixed, where the positioning pins of the heating plate supporting plate and the locking bar-plate are fastened externally.

For this purpose, an interlocking welded steel structure, the lower insert 22 to be arranged in the mold during molding so that it is fully co-molded inside, has been conceived.

The lower insert 22 protrudes only for a very small portion, where the threaded hole used to fasten the external components is located.

The lower insert 22, made of steel, is advantageously provided so that it can be on both mutually opposite sides of the lower jaw 2.

The upper jaw 3, also made of plastic material, is structurally much lighter than the lower jaw 2, requiring another kind of mechanical stress.

The resting region of the base of the threaded tension member 23 is affected by a force that is parallel to the axis of the threaded tension member 23, because it is here that the tension member moves the upper jaw 3 toward the lower jaw 2, surrounding the pipe 300.

A welded interlocking steel structure, the upper insert 32, is provided also for the upper jaw 3 and is to be arranged in the mold during molding so that it is fully co-molded internally; the upper insert 32 is not visible.

The upper jaw 3, hinged with a pivot 33 to the lower jaw 2 at one end, allows the rotation of the upper jaw 3, for opening and closing the clamp.

At the other end, the fastened threaded tension member 23, with a pivot in the lower jaw 2, can rotate to enter or exit, through the fork opening 34 provided in the upper jaw 3 for clamping and locking the pipe 300.

The jaws made of plastic material according to the present invention have been designed considering an injection molding technology; therefore, consideration has been given to the thickness, to the position of the structural ribs, to the references for support and perfect positioning of the co-molded steel inserts, to reinforcement spokes, to mold shapes for extracting the part from the mold, to top regions finished by molding and regions that to be finished after molding with a machine tool, in order to have a precise position and center distances of the oil pressure-actuated cylinders.

With respect to conventional jaws made of cast aluminum, the pipe retention ribs of the present invention are increased, eliminating the bevel for guiding pipes, connectors in the various shapes.

Figure 10:
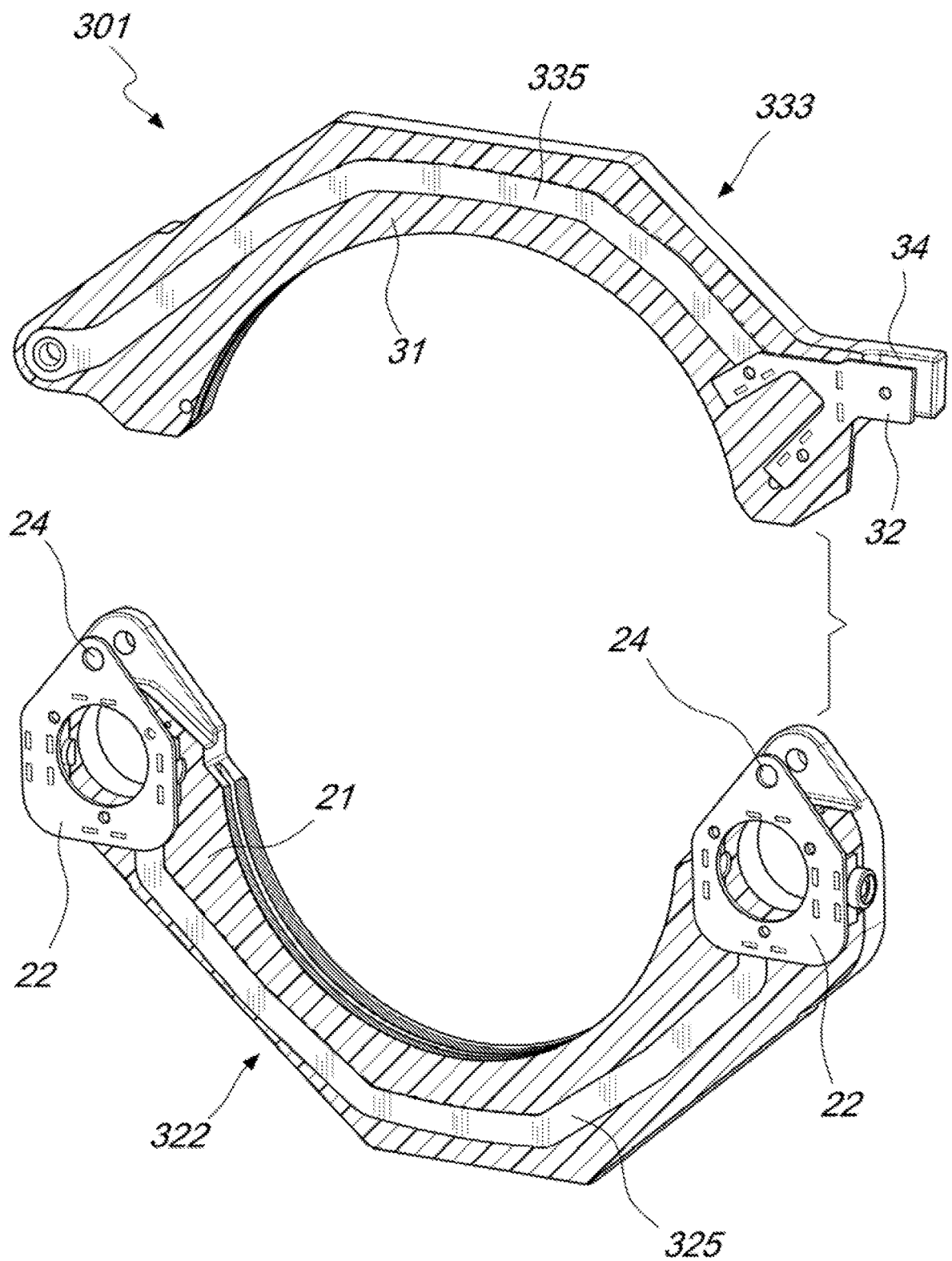
FIG. 10 is a partially exploded sectional view of a clamp according to a further aspect of the present invention.

FIG. 10 is a view of an embodiment of the clamp according to a further aspect of the present invention, generally designated by the reference numeral 301, wherein the components that are similar to the embodiment described above are designated by the same reference numerals.

The clamp 301 includes a lower jaw 322 and an upper jaw 333 which are mutually opposite and hinged.

According to this embodiment, each jaw 322 and 333 has a metallic core, made for example of steel.

In particular, the lower jaw 322 has a lower metallic core or rib 325 and the upper jaw 33 has an upper metallic core or rib 335.

Figure 11:
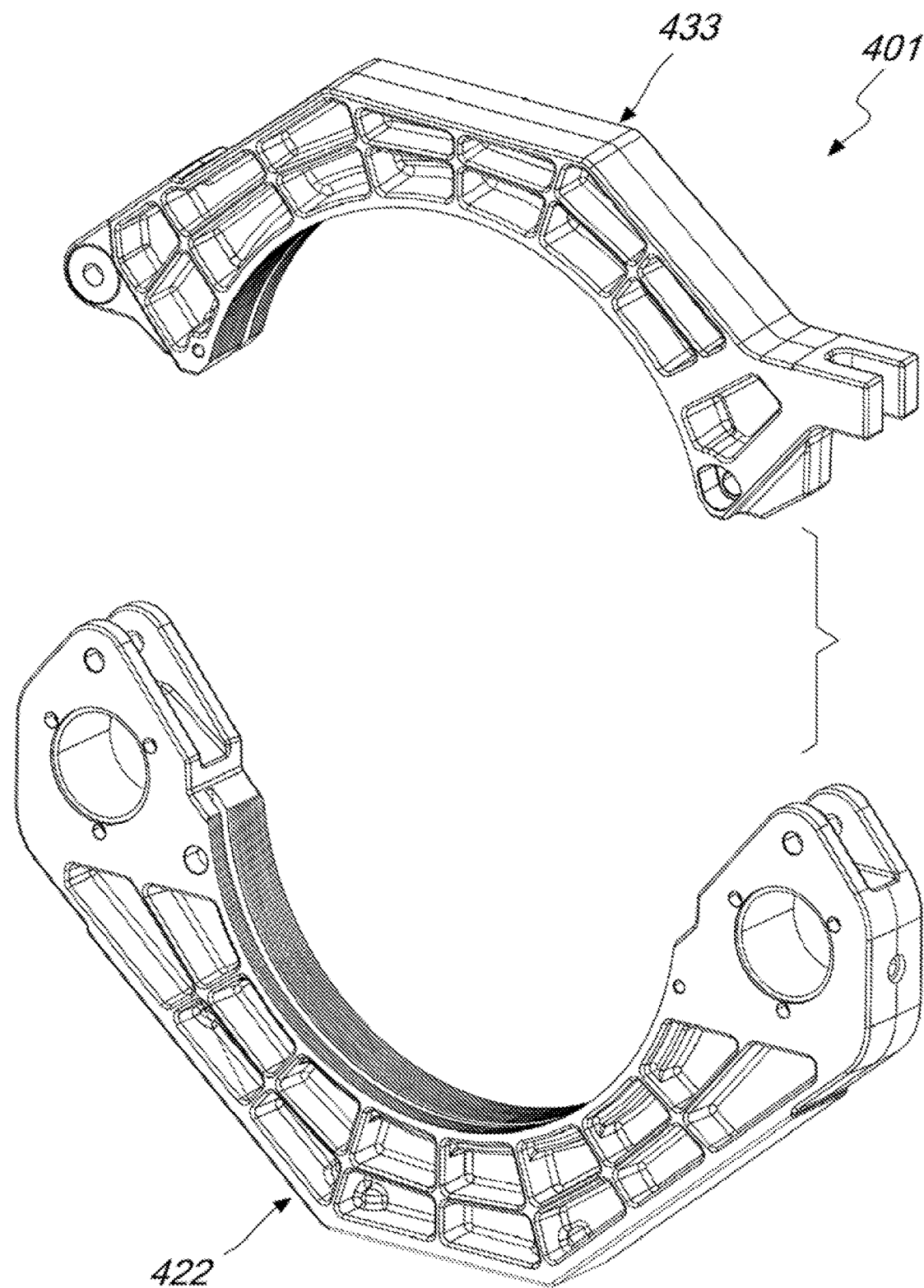
FIG. 11 is a perspective view of a clamp according to a further aspect of the present invention.
Figure 12:
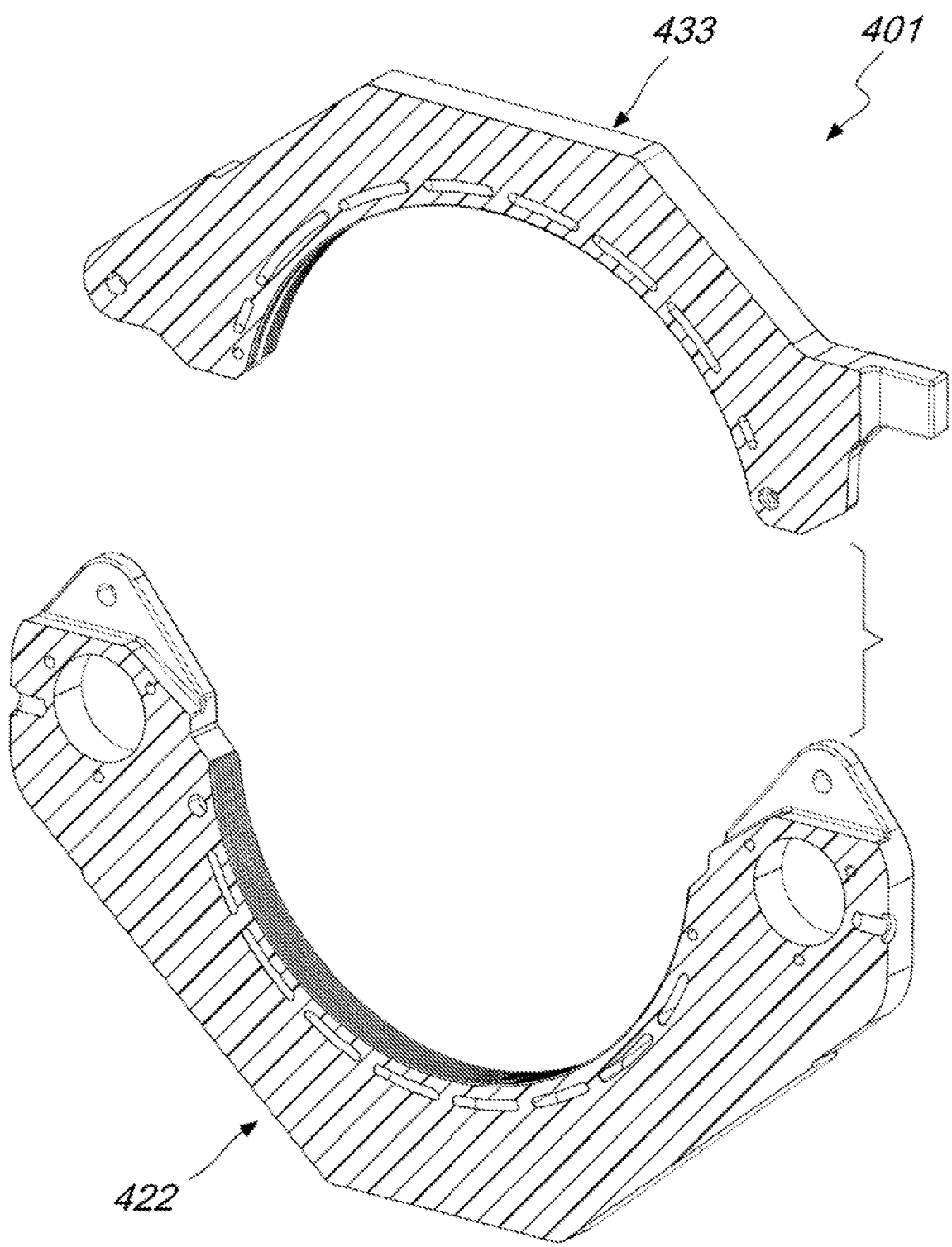
FIG. 12 is a sectional perspective view of the clamp of the preceding figure.

FIGS. 11 and 12 show a clamp, generally designated by the reference numeral 401, including a lower jaw 422 and an upper jaw 433 which are mutually opposite and hinged. Each jaw 422 and 433 is entirely made of plastic material, without any metallic insert.

In practice it has been found that the invention achieves the intended aim and objects, providing a new clamp which offers considerable advantages, especially in terms of weight, with respect to traditional metallic clamps.

This application claims the priority of Italian Patent Application No. 102021000031073, filed on Dec. 10, 2021, the subject matter of which is incorporated herein by reference.

The invention claimed is:

1. A clamp for apparatuses for welding pipes, comprising a lower jaw and an upper jaw that are mutually opposite and hinged; each jaw being substantially made of plastic material; each jaw comprising a portion made of plastic material and at least one insert constituted by an interlocking metallic structure that is co-molded in said portion made of plastic material.

2. The clamp according to claim 1, wherein said lower jaw has a lower body made of plastic provided with a pair of lower inserts made of metal.

3. The clamp according to claim 2, wherein said lower insert protrudes from said lower body only for a small portion, where a threaded hole is located for the fastening of external components.

4. The clamp according to claim 2, wherein said lower inserts of said lower jaw are identical.

5. The clamp according to claim 1, wherein said upper jaw has an upper body made of plastic and provided with an upper insert made of metal.

6. The clamp according to claim 1, wherein said lower jaw comprises a lower metallic core and said upper jaw comprises an upper metallic core.

7. The clamp according to claim 1, wherein, at said upper insert, a fork opening accommodates a tension member which is hinged to a hole of a lower insert of said lower jaw, in a region where the base of said tension member rests, which is affected by a force that is parallel to the axis of the tension member; said tension member moving said upper jaw toward said lower jaw, surrounding a pipe.

8. The clamp according to claim 1, wherein said upper jaw is fixed by means of a pivot to said lower jaw on one side and allows rotation for opening and closing said clamp.

9. The clamp according to claim 7, wherein, at the opposite side, said threaded tension member fastened by means of a pivot to the lower jaw can rotate in order to enter or exit through said fork opening provided in said upper jaw, for the clamping and locking of the pipe.

10. A welding apparatus for welding pipes, comprising at least one clamp which comprises a lower jaw and an upper jaw which are mutually opposite and hinged; each jaw comprising a portion made of plastic material and at least one insert constituted by an interlocking metallic structure that is co-molded in said portion made of plastic material.

11. A clamp for apparatuses for welding pipes, comprising a lower jaw and an upper jaw that are mutually opposite and hinged; each jaw being substantially made of plastic material; each jaw comprising a portion made of plastic material and at least one insert constituted by an interlocking metallic structure that is co-molded in said portion made of plastic material, wherein said lower jaw has a lower body made of plastic provided with a pair of lower inserts made of metal.

\* \* \* \* \*